United States Patent
Arditti et al.

[11] Patent Number: 6,125,445
[45] Date of Patent: Sep. 26, 2000

[54] PUBLIC KEY IDENTIFICATION PROCESS USING TWO HASH FUNCTIONS

[75] Inventors: David Arditti, Clamart; Henri Gilbert, Bures sur Yvette; Jacques Stern, Paris; David Pointcheval, Cachan, all of France

[73] Assignee: France Telecom, Paris, France

[21] Appl. No.: 09/076,818

[22] Filed: May 13, 1998

[30] Foreign Application Priority Data

May 13, 1997 [FR] France .................................. 97 05830

[51] Int. Cl.[7] ...................................................... H04L 9/00
[52] U.S. Cl. ............................ 713/169; 713/168; 713/200
[58] Field of Search ................................ 380/28; 713/168, 713/169, 176, 200

[56] References Cited

U.S. PATENT DOCUMENTS

| | | | |
|---|---|---|---|
| 4,995,082 | 2/1991 | Schnorr | 380/23 |
| 5,140,634 | 8/1992 | Guillou et al. | 380/23 |
| 5,218,637 | 6/1993 | Angebaud et al. | 380/23 |
| 5,323,146 | 6/1994 | Glaschick | 340/825.34 |
| 5,502,764 | 3/1996 | Naccache | 380/23 |
| 5,790,667 | 8/1998 | Omori et al. | 380/23 |

FOREIGN PATENT DOCUMENTS 0 311 470   4/1989   European Pat. Off. .

*Primary Examiner*—Tod R. Swann
*Assistant Examiner*—Steve Kabakoff
*Attorney, Agent, or Firm*—Oblon, Spivak, McClelland, Maier & Neustadt, P.C.

[57] ABSTRACT

A process for the identification of a claimant by a verifier. The process is of the public key type, where the public exponent is equal to 3. The claimant draws at random a first exponent $\alpha$, calculates $r=g^{\alpha}$ mod n and transmits $R=r^3$. The verifier draws at random a second exponent $\beta$, calculates $t=g^{\beta}$ mod n, calculates $T=t^3$ mod n and $h=H_1(Z)$, where $H_1$ is a hash function, and calculates $Z=R^3$ mod n. The verifier transmits to the claimant the numbers T and h. The claimant calculates $Y=T^{\alpha}$ mod n, verifies the result $H_1(Y)$, calculates $H=H_2(Y)$, where $H_2$ is another hash function, calculates $z=rS$ mod n, and transmits z and H. The claimant also has a secret number S equal to the modulo n cubic root of a number I deduced from its identity so that the number S verifies $S^3=I$ mod n. The verifier verifies that H received is equal to $H_2(Z)$ and that $z^3$ is equal to RI mod n.

2 Claims, 3 Drawing Sheets

PUBLIC KEY IDENTIFICATION PROCESS USING TWO HASH FUNCTIONS

BACKGROUND OF THE INVENTION

1. Field of the Invention

The present invention relates to a cryptographic identification process enabling a random support, called an identity module (e.g., a smart card, microprocessor, computer, etc.), to prove its identity to means implementing an application, or an interlocutor having verification means, using a protocol setting into action, without revealing the same, one or more secrets contained in the support.

Thus, an identification protocol is a dialogue, through a telecommunications network, between two entities, on the one hand a first entity wishing to prove its identity and which can, if appropriate, be equipped with a terminal (e.g., a computer having a smart card reader) and on the other hand a second entity able to dialogue with the first and perform certain verification calculations.

The first entity, whose identity is to be verified or checked, is hereinafter called the claimant and the second is called the verifier.

The present invention more particularly relates to a public key identification process, where the verifier has no need to know the secrets contained in the identity module of the claimant, but only non-confidential data (the public key) in order to carry out verification calculations.

2. Discussion of the Background

The RSA (initials of the authors RIVEST, SHAMIR, ADLEMAN) public key encryption algorithm is described in U.S. Pat. No. 4,405,829. At present, it is the most widely used public key algorithm. It supplies signature diagrams also usable for identification purposes.

In the RSA algorithm, a choice is made of two separate prime numbers p and q and their product n is formed. A choice is also made of an integer e, which is prime with the smallest common multiple of (p−1) and (q−1) (or, if desired, which is prime with the product (p−1)(q−1).

In order to encrypt a message, previously placed in digital form u, u being between 0 and n−1, the eth power of u is calculated in the ring of modulo n integers, i.e. $v=u^e$ mod n. It is pointed out that the value of a modulo x integer integer n is equal to the remainder of the division of x by n.

For decrypting a message such as v, it is necessary to extract the eth root of the encrypted message v in the ring of the modulo n integers. This operation amounts to raising the number v to the power d, d being the inverse of the modulo e exponent, the smallest common multiple of the numbers (p−1) and (q−1). If the prime factors p and q are not known, the determination of d is impossible and, with it, the decrypting operation.

One of the first practical uses of the RSA process for identification purposes has been the following: an authority, responsible for the putting into place of an identification system, emits a RSA-type public key, i.e. in practice the two numbers n and e, said key being common to the complete system, and retains the corresponding secret elements (p and q). In each identity module of system users, said authority deposits the pair constituted by:

the identification number ID of the identity module;

the eth rooth (or the inverse of the eth root), modulo n, of a number obtained from the number ID by applying to ID a redundancy function known by everyone (whereof an example can be found in ISO standard 9796), said eth root (or its inverse), calculated by the emission authority with the aid of secret elements held by it, is called "accreditation".

The accreditations deposited in the identity modules can, initially, be used for passive identification purposes (i.e., requiring no calculation on the part of the party wishing to prove its identity). For the verifier, the protocol is then reduced to the following operations:

reading the identity-accreditation pair contained in an identity module;

calculating the eth power of the accreditation and ensuring that the result of this calculation and the application of the redundancy function to the identification number ID do indeed provide the same result.

Such a passive identification demonstrates to the verifier that the party wishing to prove identity has data which can only have been emitted by the authority, which to a certain extent limits identity usurpations. However, nothing prevents a pirate able to intercept the claimant-verifier protocol or a dishonest verifier, from reusing for his own advantage the data supplied by the claimant.

Despite this fraud risk by reuse, the aforementioned passive identification is widely used in the banking field and in the field of telecommunications or phone cards. Supplementary precautions (black lists, etc.) to a certain extent limit the magnitude of frauds by reuse.

However, to solve the problem of fraud by the reuse of exchanged data and which is inherent in passive identification protocols, active identification protocols, i.e. requiring calculations on the part of the party wishing to prove identity, have been proposed. These protocols not only include the use of the RSA algorithm for signing a random question posed by the verifier, but also interactive diagrams where the claimant demonstrates to the verifier that he has one or more accreditations of the type defined hereinbefore and without revealing said accreditation or accreditations. The most widely used of such diagrams are the FIAT-SHAMIR and GUILLOU-QUISQUATER diagrams respectively shown in FIGS. 1 and 2. The FIAT-SHAMIR identification diagram is described in U.S. Pat. No. 4,748,668. The GUILLOU and QUISQUATER identification diagram is described in FR-A-2 620 248 (or its corresponding EP-A-311 470 or corresponding U.S. Pat. No. 5,218,637).

These two diagrams consist of one or more iterations of a base variant with three passes, in which:

1. the party wishing to prove identity (the claimant) calculates the eth power modulo n of a random number r which he draws and deduces therefrom a number x, called the control and which he supplies to the verifier;
2. the verifier draws at random a number b, called the question and sends it to the claimant;
3. the claimant calculates e.g. the product of the random number r by the bth power of his accreditation, i.e. $y=rS^b$ mod n and sends the result y to the verifier, who can calculate the eth power of y and, as he knows the eth power of the accreditation S of the claimant, he is then able to verify consistency between x, b and y.

These diagrams offer a double advantage for active identification. On the one hand, if it is possible to accept an insecurity level (defined as the maximum probability of success of a defrauder) of approximately $10^{-6}$, they are much less costly with respect to calculation time than a RSA signature. On the other hand, at least in their basic version are based on zero knowledge disclosure, so that exchanges linked with an identification procedure cannot assist a defrauder in seeking secret accreditations of a user.

Two configurations can be envisaged for implementation, namely on the claimant side, active identification diagrams demonstrating the possession of accreditations of the type described hereinbefore. In a first configuration, the identity module containing the accreditations has an adequate calculation power for performing all the calculations on this side. In a second configuration the identity module containing the accreditations does not perform the calculations itself, but instead allows them to take place in a terminal (e.g., a microcomputer able to read the accreditations in the identity module).

The second configuration, although slightly less reliable than the first, can still be useful for improving the security of the verification of identity modules initially designed for a passive identification. It is necessary to have confidence in the terminal used on the claimant side, but provided that said terminal is integrated, it is not possible for any fraud to come from the network or the verifier.

In the present invention, more particular interest is attached to the problem of use, according to the second configuration, of identity supports initially designed for a passive identification, in which a single accreditation corresponding to a public exponent e equal to 3 has been deposited. Most French bank cards, as well as other identity supports (e.g. telecommunications cards) are of this type.

The GUILLOU-QUISQUATER process is in theory usable by the terminal on the claimant side, for demonstrating to the verifier the possession of the accreditation. In this particular case, the GUILLOU-QUISQUATER process comprises the following operations:

a) two large prime numbers p and q define the integer n, the product of p by q, the number n being rendered public;

b) the calculation support having to prove its identity contains a secret accreditation S between 1 and n−1, the modulo n accreditation cube, i.e. $I=S^3$ mod n, being rendered public;

c) the support of the claimant is provided with means able to draw at random an integer r between 1 and n−1 and calculate the cube of r modulo n, called the control x: $x=r^3$ mod n;

d) the claimant transmits the control x to the verifier;

e) the verifier draws at random an integer b lower than the exponent 3, i.e. equal to 0, 1 or 2, said integer being called the question;

f) the verifier transmits the question to the claimant;

g) the claimant calculates the number y defined by: $y=rS^b$ mod n;

h) the claimant transmits the number y to the verifier;

i) the verifier raises to the cube the number y and calculates the product of the control x (which has been transmitted to him) by the power b of I (b drawn by him and I which is public), the verifier then comparing $y^3$ and $xI^b$ mod n—if consistency arises, the claimant has correctly replied to the question and his authenticity is assumed.

The security of such a diagram is based on the very hypothesis of the RSA diagram. As both the integer n and the exponent 3 are public, it is difficult for a third party defrauder, to arrive at r by taking the cubic root of x, without knowing the factors p and q, whereof n is the product. Without the knowledge of r, the defrauder cannot correctly reply to the question posed by the verifier.

For such a process, as well as for other hitherto known identification diagrams, the situation where there is only a single accreditation corresponding to a public exponent equal to 3 leads to protocols which are very costly as regards communications. Thus, the security level of a basic exchange (control, question, answer) implementable under the aforementioned conditions is lower than or equal to 3 for the GUILLOU-QUISQUATER diagram. In order to arrive at an appropriate security level (insecurity below $2^{-16}$), it is consequently necessary to repeat the basic exchange at least a dozen times, which leads to an increase in the number of bits to be exchanged between the claimant and the verifier by a factor of at least ten.

SUMMARY OF THE INVENTION

The object of the present invention is to obviate this disadvantage. It consists of proposing a diagram, which is both realistic as regards to calculation time and less costly with regards to the number of bits exchanged, making it possible to demonstrate the possession of an accreditation corresponding to a public exponent equal to 3, without revealing it.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE INVENTION

Figure 1:
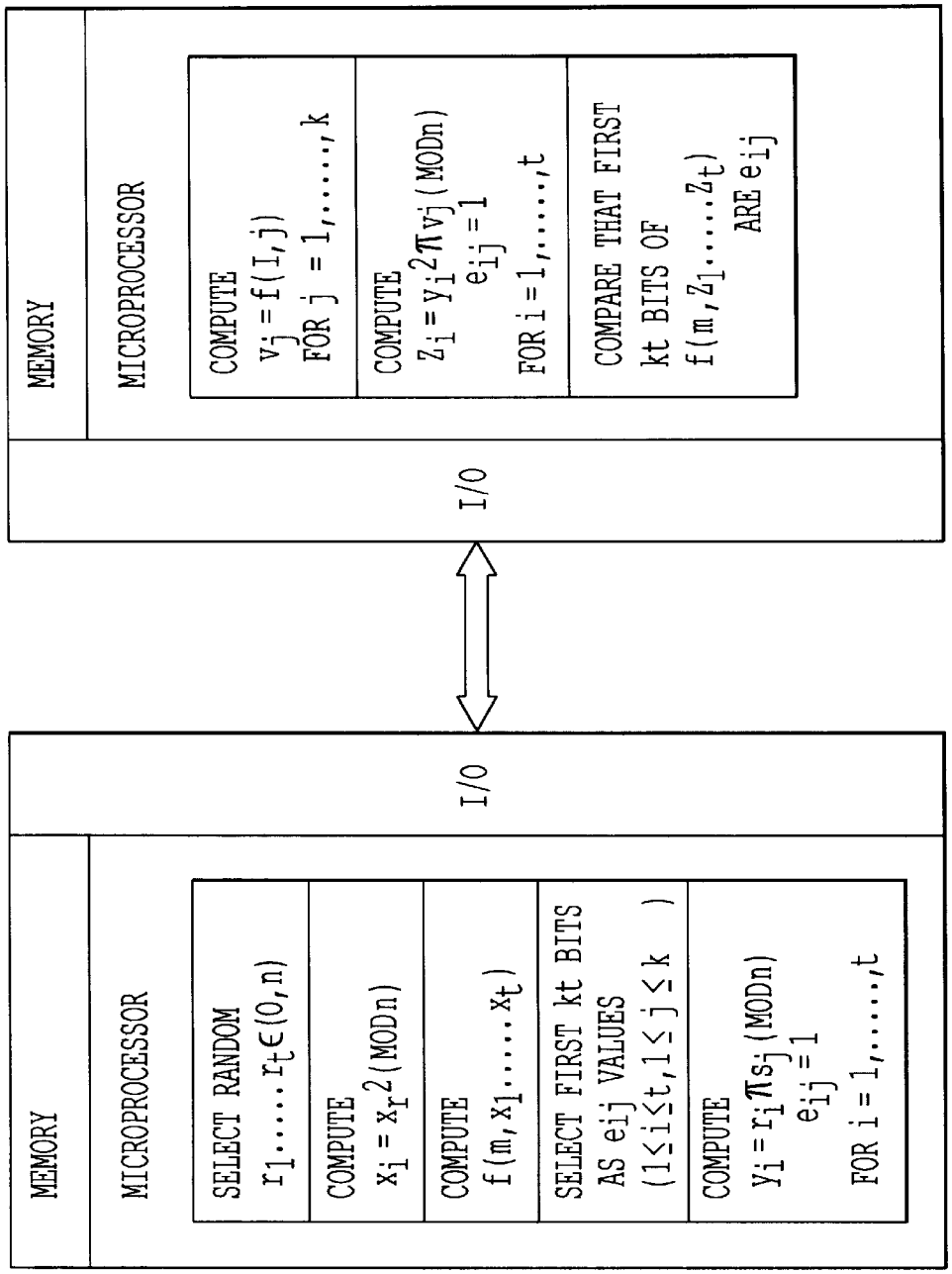
FIG. 1 illustrates a Fiat-Shamir diagram.
Figure 2:
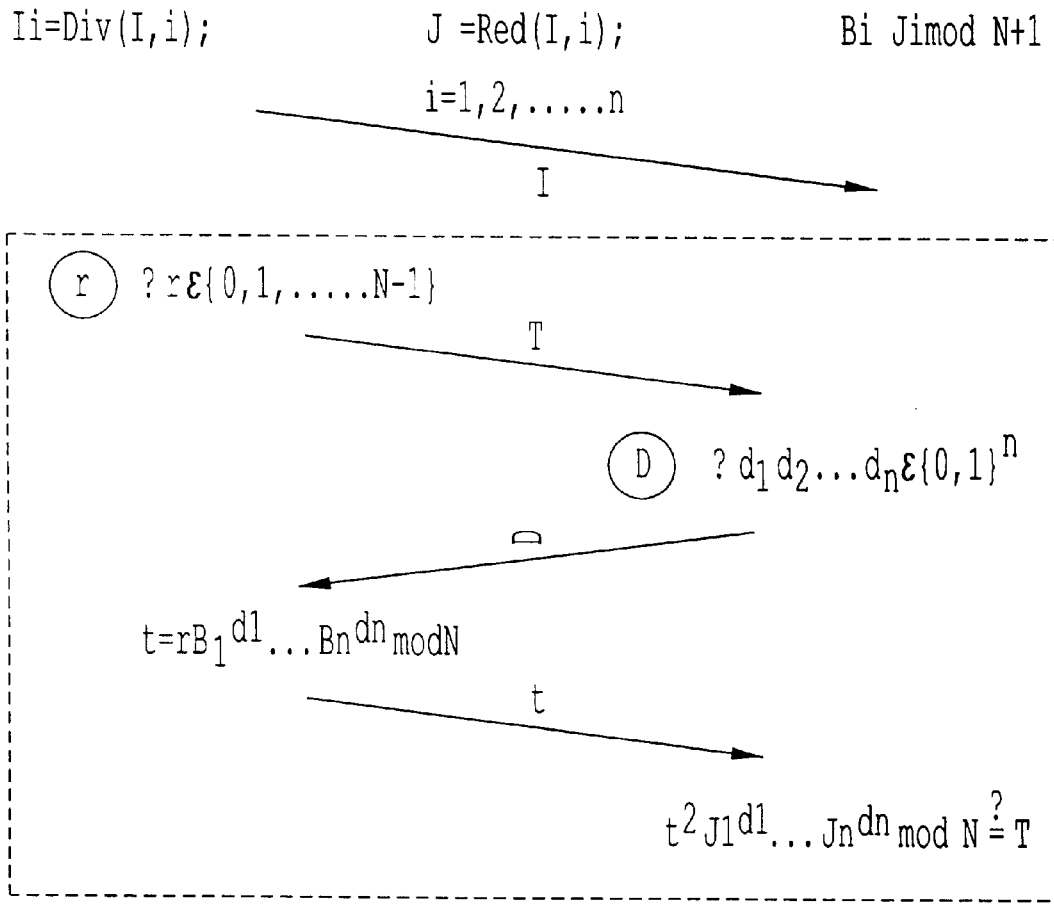
FIG. 2 illustrates a Guillou-Quisquater diagram.

The process according to the invention is based on the following, standard security hypothesis, known as the Diffie and Hellman hypothesis: given an integer n of adequate size, an integer g lower than n, and two integral powers of g modulo n designated $g^\alpha$ mod n and $g^\beta$ mod n, it is difficult to calculate $g^{\alpha\beta}$ mod n without knowing either $\alpha$ or $\beta$.

Under this hypothesis, the invention relates to a process for the identification of a support, called "the claimant", by means called "the verifier", said support and said means being equipped with appropriate calculation and storage means, the claimant and verifier having in common:

a first integer n, which is the product of two prime numbers (p, q), a second integer g between 0 and n−1 and of high order k (the order k being defined as the smaller of the numbers such that $g^k=1$ mod n), a parameter m determining the interval [0, m−1] in which are drawn the random exponents, a first and second separate hash functions $H_1$, $H_2$ and which are independent of one another, the claimant also having a secret number S equal to the modulo n cubic root of a number I deduced from his identity, so that the number S verifying: $S^3=I$ mod n, wherein the claimant and verifier utilize their calculation and storage means for performing the following, successive operations:

phase A: the claimant:

Aa) draws at random a first integral exponent $\alpha$ between 0 and m−1,

Ab) calculates a number r equal to the power $\alpha$ of the modulo n number g, namely $r=g^\alpha$ mod n, Ac) calculates a number R equal to the cube of r modulo n, namely: $R=r^3$ mod $n=g^{3\alpha}$ mod n, Ad) transmits the number R to the verifier;

phase B: the verifier:
Ba) draws at random a second integral exponent $\beta$ between 0 and m−1,
Bb) calculates a number t equal to the power $\beta$ of the g modulo n number, namely: $t = g^\beta$ mod n,
Bc) calculates a number T equal to the cube of t modulo n, namely: $T = t^3$ mod $n = g^{3\beta}$ mod n,
Bd) calculates a number Z equal to the power $\beta$ of R modulo n, namely: $Z = R^\beta$ mod n,
Be) applies the first hash function $H_1$ to Z for obtaining a number h: $h = H_1(Z)$,
Bf) transmits to the claimant the numbers T and h;

phase C: the claimant:
Ca) calculates a number Y equal to the power $\alpha$ of the number T modulo n, namely: $Y = T^\alpha$ mod n,
Cb) applies to the number Y the first hash function $H_1$ and obtains the result $H_1(Y)$ and verifies whether this result is equal to the number h received from the verifier,
Cc) applies to the number Y the second hash function $H_2$ for obtaining a result H: $H = H_2(Y)$,
Cd) calculates a number z equal to the product of the number r by the secret S modulo n, namely: $z = rS$ mod n,
Ce) transmits the numbers z and H to the verifier;

phase D: the verifier:
Da) applies to the number Z the second hash function $H_2$ and verifies whether the result obtained $H_2(Z)$ is equal to the number H received from the claimant,
Db) calculates, on the one hand, the product of R by I modulo n and, on the other hand, the cube of z modulo n and checks whether the two results are equal, the identification of the claimant by the verifier being made if the three verifications Cb) Da) Db) are performed.

The parameter m, which the claimant and verifier have in common, can be chosen with the same order of magnitude as k, or equal to n. The value of m must not reveal that of k, which is not known either to the claimant or to the verifier.

Figure 3:
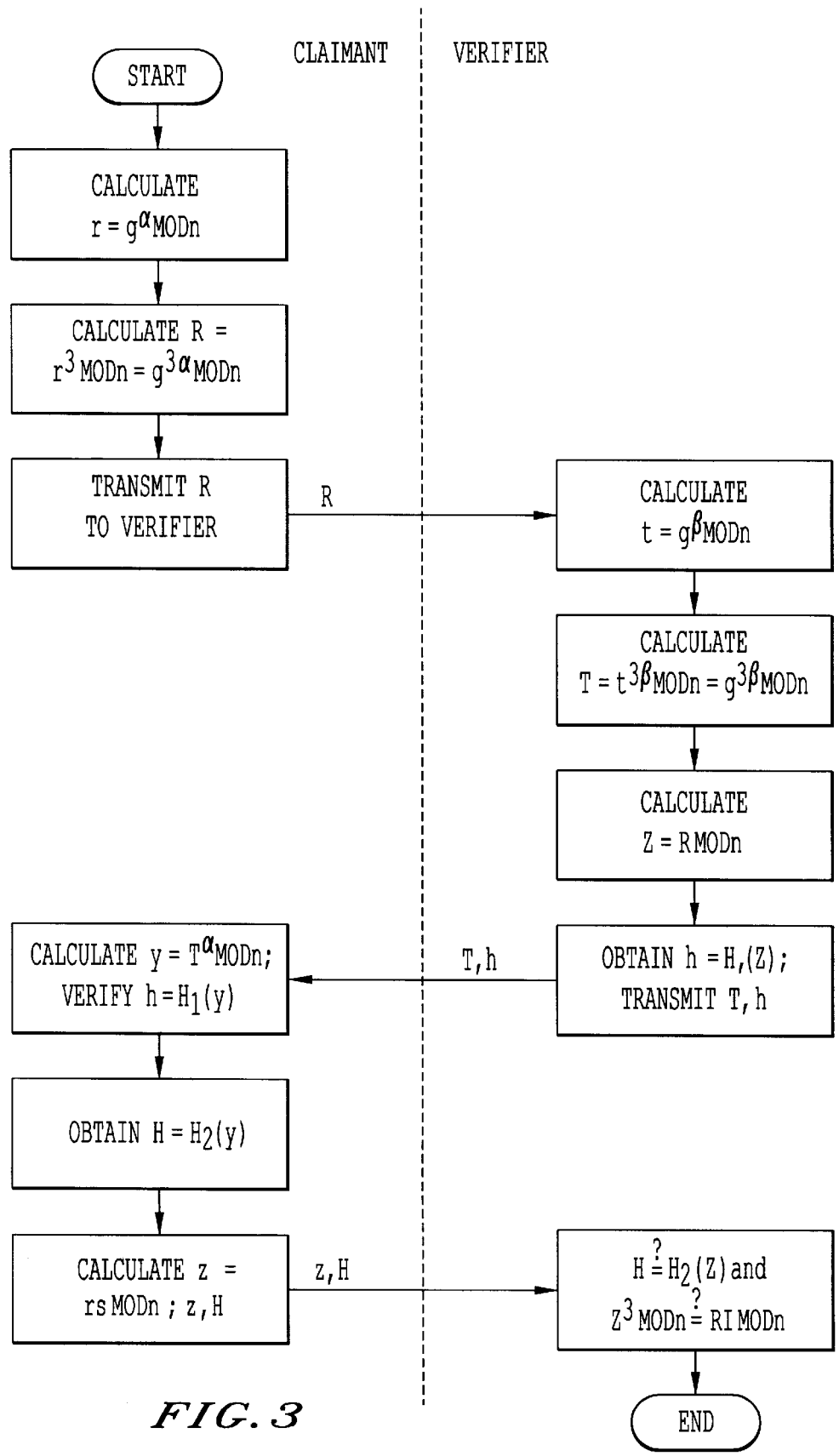
FIG. 3 is a flow chart illustrating the operations of the claimant and verifier according to the present invention.

The following table summarizes the different operations. Note, FIG. 3 is a flow chart illustrating the same operations.

The horizontal band marked 0 indicates the data known by both entities, namely on the one hand, the number n, number g and cube of the secret I and, on the other hand, the two hash functions $H_1$ and $H_2$.

TABLE 1

|   | Claimant | Verifier |
|---|---|---|
| 0 | n, g, I<br>$H_1$, $H_2$<br>$\alpha < m$ | n, g, I<br>$H_1$, $H_2$ |
| A | $r = g^\alpha$ mod n<br>$R = r^3 = g^{3\alpha}$ · mod n   $\xrightarrow{R}$ |  |
|   | $\beta < m$ |  |
| B |  | $t = g^\beta$ mod n<br>$T = t^3 = g^{3\beta}$ mod n<br>$Z = R^\beta$ mod n |
|   | $\xleftarrow{T, h}$ | $h = H_1(Z)$ |
| C | $Y = T^\alpha$ mod n |  |

TABLE 1-continued

|   | Claimant | Verifier |
|---|---|---|
|   | $h \stackrel{?}{=} H_1(Y)$ |  |
|   | $H = H_2(Y)$ |  |
|   | $z = rS$ mod n   $\xrightarrow{z, H}$ |  |
|   | $H \stackrel{?}{=} H_2(Z)$ |  |
| D |  | $z^3 \stackrel{?}{=} RI$ mod n |

The horizontal band A gives the first operations performed by the claimant (operations Aa to Ad in the above definition).

The horizontal band B gives the following operations performed by the verifier (operations Ba to Bf).

The horizontal band C gives the operations again performed by the claimant (operations Ca to Ce).

Finally, the horizontal band D gives the two final operations performed by the verifier.

Such a process makes it possible to check the authenticity of the holder of an accreditation. Thus, if the claimant knows the secret S, he can correctly reply to the questions asked by the verifier, because he can calculate the quantity $z = rS$ mod n.

Conversely, in order to be accepted, the claimant must ensure that the equation $H = H_2(Z)$ is satisfied and, for this purpose, after supplying R to the verifier and receiving $T = g^{3\beta}$ mod n, he must be able to supply a number H, such that $H = H_2(R^\beta)$:

1. either H is not calculated with the aid of the hash function $H_2$, then, by admitting that $H_2$ can be modelled as a random function, there is a negligible probability of relation $H = H_2(R^\beta)$ is satisfied;
2. or H is the result of $H_2$ on a value Y, then (unless there is a collision of $H_2$) Y is equal to Z, in which case, on the basis of $T = g^{3\beta}$, the claimant is able to calculate $T^\alpha = g^{3\alpha\beta}$ and then, on the basis of the starting hypothesis, he knows such that $R = g^{3\alpha}$ mod n.

In addition, the claimant must supply a number z, so that the relation $z^3 = RI$ mod n is satisfied. For this purpose, he must supply a cubic root of RI, such that $RI = g^{3\alpha}I$ mod n, then $I = (zg^{-\alpha})^3$ mod n.

It is also possible to prove, by means of a few supplementary hypotheses of a not very restrictive nature, that a defrauder using all imaginable fraudulent procedures cannot obtain any information on the accreditation of the claimant and consequently usurp his identity.

Thus, assuming that said defrauder interrogates the claimant (passing himself off as the verifier) with a view to extracting from him an information on the accreditation S:

a) when confronted with an honest claimant, the defrauder is obliged to ask questions honestly and to satisfy the equation $h = H_1(Y)$, after receiving $R = g^{3\alpha}$, he must supply T and h, such that $h = H_1(T^\alpha)$:
1. either h is not calculated with the aid of $H_1$, then, by admitting that $H_1$ can be modelled as a random function, there is a negligible satisfaction probability;
2. or h is the result of $H_1$ on a value Z, then, unless there is a collision of $H_1$, we obtain Y=Z and in this case, on the basis of $R = g^{3\alpha}$, the verifier is able to calculate $T^\beta = g^{3\alpha\beta}$ and on the basis of the starting hypothesis, he knows $\beta$ such that $T=g^{3\beta}$ mod n;

b) in the case where the secret S can be expressed as an integral power $g^\nu$ of g and where the value of m is close to a multiple of k, it is possible to simulate the claimant without knowing the secret S, which means that the interactions which the defrauder can have with the claimant will not enable him to learn anything about S and the simulator will then perform the following operations:

1. he chooses a number $\delta$ below m,
2. he calculates $z=g^\delta$ mod n, $z^3=g^{3\delta}$ mod n and $R=z^3 I^{-1}$, i.e. $g^{3(\delta-\nu)}$ mod n, (the numbers R and z formed in this way roughly follow the same distribution as $R=g^{3\alpha}$ and $z=g^{\alpha+\nu}$),
3. he supplies R to the verifier, who returns T and h—as shown hereinbefore, the verifier is necessarily honest, which means that he knows $\beta$ such that $T=g^{3\beta}$ mod n and can consequently have knowledge of $\beta$ (then $T=g^{3\beta}$ mod n, $Z=R^\beta$ mod n and $h=H_1(Z)$),
4. he calculates $Y=R^\beta=Z$ mod n and $H=H_2(Y)$,
5. he supplies (z,H) to the verifier.

Therefore the above-defined process is reliable and secure, even when confronted with active attacks.

What is claimed is:

1. A process for an identification of a calculation and storage means claimant by a verifier, the claimant and verifier having calculation and storage mechanisms, wherein the claimant and verifier have the following in common:
- a first integer n, which is the product of two prime numbers (p, q),
- a second integer g between 0 and n−1 and of high order k, the order k being defined as the smaller of the numbers such that $g^k=1$ mod n,
- a parameter m determining the interval in which are drawn the random exponents,
- first and second separate hash functions $H_1$, $H_2$ and which are independent of one another, wherein the claimant further includes a secret number S equal to the modulo n cubic root of a number I deduced from its identity, so that the number S verifies: $S^3=I$ mod n, wherein the claimant and verifier utilize their calculation and storage mechanisms for performing the following, successive operations:

phase A: the claimant:
- Aa) draws at random a first integral exponent $\alpha$ between 0 and m−1,
- Ab) calculates a number r equal to the power $\alpha$ of the modulo n number g, namely; $r=g^\alpha$ mod n,
- Ac) calculates a number R equal to the cube of r modulo n, namely: $R=r^3$ mod $n=g^{3\alpha}$ mod n, and
- Ad) transmits the number R to the verifier;

phase B: the verifier:
- Ba) draws at random a second integral exponent $\beta$ between 0 and m−1,
- Bb) calculates a number t equal to the power $\beta$ of the g modulo n number, namely: $t=g^\beta$ mod n,
- Bc) calculates a number T equal to the cube of t modulo n, namely: $T=t^3$ mod $n=g^{3\beta}$ mod n,
- Bd) calculates a number Z equal to the power $\beta$ of R modulo n, namely: $Z=R^\beta$ mod n,
- Be) applies the first hash function $H_1$ to Z for obtaining a number h: $h=H_1(Z)$, and
- Bf) transmits to the claimant the numbers T and h;

phase C: the claimant:
- Ca) calculates a number Y equal to the power $\alpha$ of the number T modulo n, namely: $Y=T^\alpha$ mod n,
- Cb) applies to the number Y the first hash function $H_1$ and obtains the result $H_1(Y)$ and verifies whether this result is equal to the number h received from the verifier,
- Cc) applies to the number Y the second hash function $H_2$ for obtaining a result H: $H=H_2(Y)$,
- Cd) calculates a number z equal to the product of the number r by the secret S modulo n, namely: $z=rS$ mod n, and
- Ce) transmits the numbers z and H to the verifier;

phase D: the verifier:
- Da) applies to the number Z the second hash function $H_2$ and verifies whether the result obtained $H_2(Z)$ is equal to the number H received from the claimant, namely: $H=H_2(Z)$ and $Z^3$ mod $n=RI$ mod n, and
- Db) calculates the product of R by I modulo n and the cube of z modulo n and checks whether the two results are equal, and wherein the identification of the claimant by the verifier is made if the three verifications determined in steps Cb), Da), and Db) are performed.

2. The process according to claim 1, wherein the claimant is a smart card.

* * * * *